United States Patent
Hurtta et al.

(10) Patent No.: US 7,870,269 B2
(45) Date of Patent: *Jan. 11, 2011

(54) METHOD AND SYSTEM FOR ACTIVATING A PACKET DATA SUBSCRIBER CONTEXT FOR PACKET DATA

(75) Inventors: Tuija Hurtta, Espoo (FI); Marko Suoknuuti, Espoo (FI)

(73) Assignee: Nokia Corporation, Espoo (FI)

( * ) Notice: Subject to any disclaimer, the term of this patent is extended or adjusted under 35 U.S.C. 154(b) by 161 days.

This patent is subject to a terminal disclaimer.

(21) Appl. No.: 12/222,162

(22) Filed: Aug. 4, 2008

(65) Prior Publication Data

US 2009/0116478 A1    May 7, 2009

Related U.S. Application Data

(63) Continuation of application No. 10/221,398, filed as application No. PCT/EP00/02360 on Mar. 16, 2000, now Pat. No. 7,467,208.

(51) Int. Cl.
    G06F 15/16    (2006.01)
(52) U.S. Cl. .................. 709/228; 709/227; 370/467
(58) Field of Classification Search ......... 709/227–228, 709/249–250, 238; 370/230–235
    See application file for complete search history.

(56) References Cited

U.S. PATENT DOCUMENTS

| | | | |
|---|---|---|---|
| 6,104,799 A | 8/2000 | Jain et al. | |
| 6,169,796 B1 | 1/2001 | Bauer et al. | |
| 6,591,301 B1 | 7/2003 | Li et al. | |
| 6,600,732 B1 | 7/2003 | Sevanto et al. | |
| 6,615,269 B1 | 9/2003 | Suumaki et al. | |
| 6,708,034 B1 | 3/2004 | Sen et al. | |
| 6,714,544 B1 * | 3/2004 | Bosloy et al. | 370/395.1 |
| 6,763,233 B2 * | 7/2004 | Bharatia | 455/433 |
| 6,876,658 B2 | 4/2005 | Epley | |

(Continued)

FOREIGN PATENT DOCUMENTS

JP    2003/521199    7/2003

(Continued)

OTHER PUBLICATIONS

"ISDN User-Network Interface Layer 3 Specification for Basic Call Control," International Telecommunication Union, Series Q: Switching and Signalling, Digital Subscriber Signalling System No. 1-Network Layer, ITU-T Recommendation Q.931, May 1998, pp. 1-329.

(Continued)

*Primary Examiner*—Salad Abdullahi
(74) *Attorney, Agent, or Firm*—Mintz, Levin, Cohn, Ferris, Glovsky and Popeo, P.C.

(57) ABSTRACT

A method and system for activating a context in a first network so as to transfer a call via said first network and a second network is provided. The method may include receiving a setup message according to an application protocol using a signaling or default context within a network, determining capability information based on the message according to the application protocol and activating a context using the determined capability information. The application protocol may be setup before activating the context.

34 Claims, 2 Drawing Sheets

U.S. PATENT DOCUMENTS

| | | | |
|---|---|---|---|
| 2001/0027490 A1 | 10/2001 | Fodor et al. | |
| 2002/0035641 A1* | 3/2002 | Kurose et al. | 709/241 |
| 2003/0172160 A9 | 9/2003 | Widegren et al. | |
| 2004/0085914 A1 | 5/2004 | Baxley et al. | |

FOREIGN PATENT DOCUMENTS

| | | |
|---|---|---|
| KR | 2000-0025492 | 5/2000 |
| WO | WO 99/05828 | 2/1999 |
| WO | WO 99/51055 | 10/1999 |

OTHER PUBLICATIONS

J. Mikkonen, et al., "An Integrated QoS Architecture for GSM Networks," International Conference on Universal Personal Communications, IEEE, vol. 1, Oct. 1998, pp. 403-407.

G. Malkin, "RIP Version 2," Bay Networks, The Internet Society, Nov. 1998, pp. 1-39.

I. Dalgic, et al., "Comparison of H.323 and Sip for IP Telephony Signaling, " Proceedings of the SPIE, 1999.

"Packet-Based Multimedia Communications Systems," International Telecommunication Union, Series H: Audiovisual and Multimedia Systems, Infrastructure of Audiovisual Series—Systems and Terminal Equipment for Audiovisual Services, ITU-T Recommendation H.323, Sep. 1999, pp. 1-119.

"Call Signaling Protocols and Media Stream Packetization for Packet-Based Multimedia Communication Systems," International Telecommunication Union, Series H: Audiovisual and Multimedia Systems, Infrastructure of Audiovisual Services—Transmission Multiplexing and Synchronization, ITU-T Recommendation H.225.0, Sep. 1999, pp. 1-187.

"Control Protocol for Multimedia Communication," International Telecommunication Union, Series H: Audiovisual and Multimedia Systems, Infrastructure of Audiovisual Services—Communication Procedures, ITU-T Recommendation H.245, Feb. 2000, pp. 1-288.

Y. Bernet, "The Complementary Roles of RSVP and Differentiated Services in the Full-Service QOS Network," IEEE, vol. 38, No. 2, Feb. 2000, pp. 154-162.

3GPP TS 23.228 V5.2.0 (Oct. 2001), Technical Specification, $3^{rd}$ Generation Partnership Project, Technical Specification Group Services and System Aspects, IP Multimedia Subsystem (IMS), Stage 2, Release 5, pp. 1-123.

"Amendment 1: Extensions for the Support of Digital Multiplexing Equipment," International Telecommunication Union, Series Q: Switching and Signalling, Digital Subscriber Signalling System No. 1—Network Layer, ISDN User-Network Interface Layer 3 Specification for Basic Call Control, ITU-T Recommendation Q.931, Amendment 1, Dec. 2002, pp. 1-17.

Y. Bernet, et al., "Interoperation of RSVP/Intserv and Diffserv Networks," Internet Draft, Mar. 1999, pp. 14-33.

M. Puuskari, "Quality of Service Framework in GPRS and Evolution Towards UMTS," $3^{rd}$ European Personal Mobile Communications Conference, Paris, Mar. 9-11, 1999, pp. 34-41.

3GPP, 3G TS 23.121 V3.1.0 (Oct. 1999), Version 3.1.0, pp. 42-61.

ITU-T H.323 (Feb. 1998), Section 6.2.8 and Appendix II, pp. I-VII and 1-115.

ITU-T Q.931 (May 1998), Section 3.1.1-3.1.15, pp. 77-96.

Notice of Opposition, European Patent Office, Jun. 19, 2008.

* cited by examiner

METHOD AND SYSTEM FOR ACTIVATING A PACKET DATA SUBSCRIBER CONTEXT FOR PACKET DATA

CROSS REFERENCE TO RELATED APPLICATIONS

This application is a continuation of application Ser. No. 10/221,398, filed Oct. 29, 2002, which is a U.S. national stage of application No. PCT/EP00/02360, filed on Mar. 16, 2000. Priority is claimed on these applications.

BACKGROUND OF THE INVENTION

1. Field of the Invention

The present invention relates to a method and system for activating a context in a first network so as to transfer a call via said first network and a second network. In particular, the first network may be a cellular or mobile network such as the UMTS (Universal Mobile Telecommunications System) or a GPRS (General Packet Radio Services) network.

2. Description of the Related Art

In contrast to circuit-switched networks, traditional IP-networks employ a connectionless packet-switching paradigm which uses neither call admission control nor per-call state within the network. Each packet is simply routed to its destination hop-by-hop according to the globally unique IP destination address contained within the IP header. Individual data flows do not receive a dedicated bandwidth, and the available bandwidth is shared among all traffic. When the aggregate packet flow sent to an intermediate node output port is greater than the output link rate, packets must be queued in the output buffer which causes delay. Furthermore, in periods of congestion, the output buffer may overflow and packets will be lost.

Although traditional packet-switched data networks such as X.25 and IP/Internet can achieve high bandwidths utilisation, they cannot simultaneously offer sufficient QoS (Quality of Service) support for real-time traffic such as voice. This is unlike newer packet-switched technologies such as ATM and Frame Relay which are able to offer both high utilisation and real-time QoS support simultaneously in an environment containing both real-time and non-real-time traffic. These dual goals of QoS support and efficiency can also be provided in an IP network if a reservation protocol such as RSVP (ReSerVation setup Protocol) is used, although firm QoS guaranties can only be offered provided each intermediate router supports RSVP. Before the network can offer a bandwidth guarantee, or reservation, to a specific data flow, admission control must ensure that the guarantee can be met i.e. sufficient resources exist in the network. Otherwise, the network will not pledge the guarantee to the user.

The end-to-end QoS available to users of a packet-switched network will be determined by two components. First, the amount of distortion introduced by the network in terms of packet delay, delay variation and packet loss. Second, the degree to which this network-induced distortion can be removed, or compensated for, at the receiving terminal, a process commonly referred to as terminal conditioning. Terminal conditioning may incorporate such processes as the removal of jitter (delay variation among packets) to reconstruct the original timing relationship between packets at the receiver. In addition, it may allow the receiver to recover lost packets in cases where the sender employs some kind of robust encoding schemes that introduce redundancy among data packets transmitted.

As already mentioned above, one of the approaches that in principle might be used to guarantee, or at least maximise, the network layer QoS received by real-time traffic such as voice in multimedia packet-switched environment concerns reserving resources (bandwidths, buffer space) in the intermediate routers/switches for specific data flows and is a method used by both ATM (Asynchronous Transfer Mode) and IP/RSVP. The RSVP can be used by receiver and nodes to request end-to-end reservations in accordance with the IETF (Internet Engineering Task Force) integrated services models. RSVP is specified in the specification RFC 2205. In particular, RSVP is not a routing protocol, but is merely used to reserve resources along the existing route set up by whichever underlying routing protocol is in place. A communication session is identified by a combination of destination address, transport layer protocol type and destination port number. It is important to note that each RSVP operation only applies to packets of a particular session and as such every RSVP message must include details of the session to which it applies. RSVP messages can be transported "raw" within IP datagrams using protocol number 46 although hosts with this raw I/O capability may first encapsulate the RSVP messages within a UDP header.

In mobile networks such as UMTS or GPRS networks, sufficient end-to-end QoS for a call must be set up. To achieve this, a PDP (Packet Data Protocol) context with sufficient QoS is activated to transfer the voice traffic. Thus, the QoS requirements of a call must be known by both endpoints. By knowing the QoS requirements, the endpoints can set up the sufficient QoS with mechanisms depending on the environment of the endpoints. In combined networks where the mobile network is connected to an IP network, the RSVP has been proposed to signal the QoS requirements between the networks. However, the RSVP causes unnecessary signaling to transfer the QoS requirements. Moreover, it is questionable whether the RSVP is scaleable enough to be used on a per-call basis.

SUMMARY OF THE INVENTION

It is therefore an object of the invention to provide a method and system for activating a context, by means of which a capability exchange can be performed in an efficient way.

In one embodiment, a method may include receiving a setup message according to an application protocol using a signaling or default context within a network, determining capability information based on the message according to the application protocol and activating a context using the determined capability information. The application protocol may be setup before activating the context.

In another embodiment, an apparatus may include a receiver configured to receive a set-up message according to an application protocol using a signaling or default context within a network. The apparatus may also include a processor configured to determine capability information based on the message according to the application protocol and to activate a context using the determined capability information. The processor may be configured to set up the application protocol before activating the context.

In another embodiment, a computer program embodied on a computer-readable medium may control a processor to perform a process, including receiving a setup message according to an application protocol using a signaling or default context within a network, determining capability information based on the message according to the application protocol and activating a context using the determined capability information. The application protocol may be setup before activating the context.

In yet another embodiment, a system for activating a context in first network so as to transfer a call and/or transaction via said first network and a second network may include setup means for setting up a connection according to an application protocol using a signaling or default context within said first network, determination means for determining a capability information based on a message of said application protocol transmitted from said second network to said first network and activation means for activating said context based on said determined capability information.

In still another embodiment, a terminal device for activating a context in a first network so as to transfer a call and/or transaction via said first network and a second network may include determination means for determining a capability information based on a message of an application protocol transmitted from said second network via said first network to said terminal device. A signaling or default context may be used within said first network. The terminal device may also include activation means for activating said context using said determined capability information.

Accordingly, there is no need to use the RSVP between the first network and the second network to signal the capability information to the respective other connection end. A suitable end-to-end capability for the call and/or transaction can be agreed in advance based on the application protocol message(s) transmitted by using the signaling or default context. Then, the actual context required for transferring a call is activated according to the agreed capability information. Thereby, the additional signaling required for the RSVP can be saved so as to decrease signaling load. Moreover, the proposed solution according to the present invention is transparent for the core network, since the application protocol messages can be transparently transferred to the first network.

Preferably, the activation is performed by transmitting a context activation request message including parameters based on which the capability information is determined to the first network. The protocol setup step is preferably performed at the calling end, such that the called end is directly notified of requested connection.

The call is preferably a voice call. Thus, the network layer capability (e.g. QoS profile) required by the real-time voice traffic can be provided in an efficient manner even via different networks. However, the present invention is applicable to any call and/or transaction (e.g. service message, download program, or the like) which may be transferred based on a context activation.

Furthermore, the first network may be a mobile network, and the context may be a secondary PDP context. Such a secondary PDP context is applicable both for mobile-originated and mobile-terminated calls, such that the context activation may always be performed by the connection endpoint connected to the mobile network regardless of the origination of the call and/or transaction. The mobile network may be a UMTS network, while the second network may be an IP network.

Preferably, the application protocol may be the H.323 or H.248 protocol, or the SIP. Since these protocols are widely applicable in any IP based network, a universal solution for the capability exchange between different networks can be provided.

The capability information may be a QoS requirement. Thus, a desired QoS can be assured in the first as well as in the second network without requiring any additional RSVP signaling for reserving resources along the existing route setup within the first and the second networks. The QoS requirement may define a kind of codec (e.g. in H.323, H.248 or SIP environments) or a maximum bitrate, a guaranteed bitrate and/or a transfer delay (e.g. in the Activate (Secondary) PDP Context Request message of the GPRS core network).

Furthermore, an IETF Diffserv service may be used in intermediate networks to provide a capability according to said capability information. Based on this service, intermediate network routers can be informed of the required capability (e.g. QoS requirements) of the transferred call and/or transaction by using a signaling protocol so as to reserve required resources.

The determination means of the terminal device may be arranged to determine the capability information based on a capability agreed in a setup negotiation with a called endpoint connected to the second network, the setup negotiation being initialized by a setup means of the terminal device.

On the other hand, the determination means of the terminal device may be arranged to determine the capability information based on a protocol message received from a calling endpoint connected to the second network. Thus, due to the fact that a secondary context can be activated from the calling endpoint as well as from the called endpoint, the proposed transfer of the capability information can be performed regardless of the direction of the call transfer.

BRIEF DESCRIPTION OF THE DRAWINGS

In the following, the present invention will be described in greater detail on the basis of a preferred embodiment with reference to the accompanying drawings, in which.

DETAILED DESCRIPTION OF THE PREFERRED EMBODIMENT(S)

Figure 1:
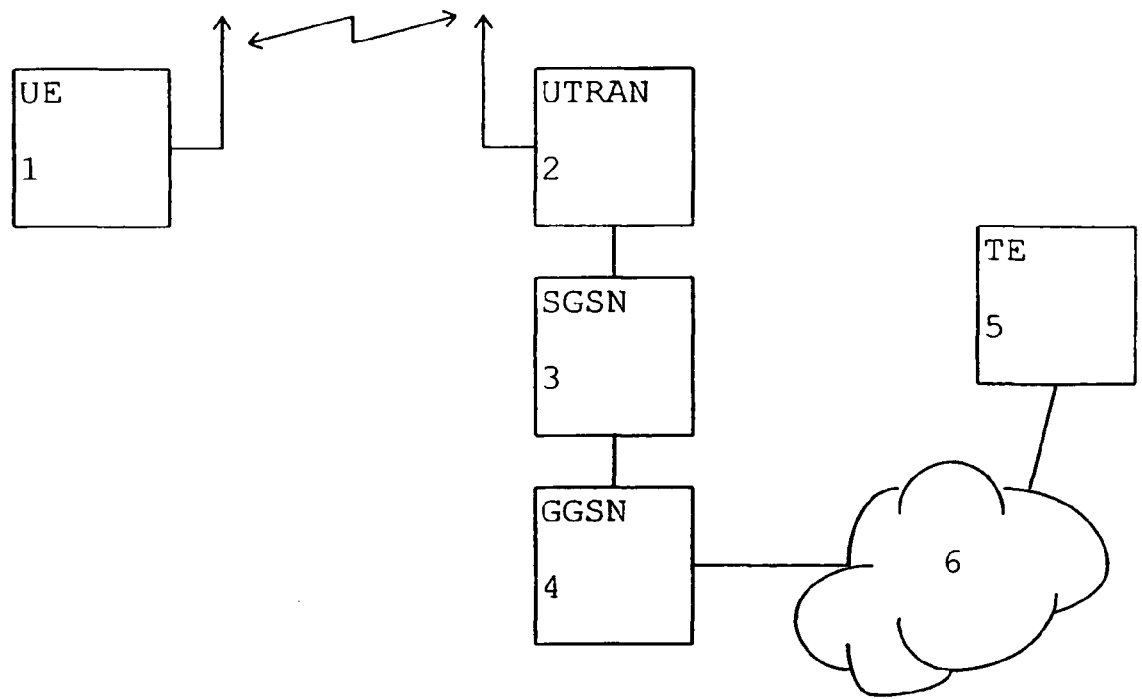
FIG. 1 shows a basic block diagram of a UMTS network connected to an IP network, where the preferred embodiment of the present invention can be implemented.

In the following, the preferred embodiment of the method and system according to the present invention will be described on the basis of a UMTS system connected to an IP network 6 as shown in FIG. 1.

According to FIG. 1, the UMTS network comprises a UTRAN (UMTS Radio Access Network) 2 connected to a GPRS-based core network, wherein a connection to the IP network 6 is established via an SGSN (Serving GPRS Support Node) 3 and a GGSN (Gateway GPRS Support Node) 4.

Furthermore, a user equipment (UE) 1 such as a mobile terminal or station is radio-connected to the UTRAN 2. The UTRAN 2 is a wireless access network which provides access to the GPRS-based core network of the UMTS network. The IP network 6 may be any IP-based network which can be connected to the UMTS network. Furthermore, a terminal equipment (TE) 5 is shown, which may be any voice or data terminal connected to the IP network 6.

Thus, according to FIG. 1, a data or voice call or any kind of transaction, such as a service message or download program or the like, can be transferred between the UE 1 and the TE 5 via the UMTS network and the IP network 6.

The main objective of the GPRS core network is to offer a connection to standard data networks (using protocols such as TCP/IP, X.25, and CLNP (ConnectionLess Network Protocol)). The packet-oriented GPRS core network infrastructure introduces two support nodes, —the GGSN 4 and the SGSN 3. The main functions of the GGSN 4 involve interaction with the external IP network 6. The GGSN 4 updates the location directory using routing information supplied by the SGSN 3 about a path of a concerned mobile terminal and routes the external data network protocol packet encapsulated over the GPRS backbone to the SGSN 3 currently serving the concerned mobile terminal (e.g. the UE 1). It also decapsulates and forwards external data network packets to the IP network 6 and handles the charging of data traffic. The main functions of the SGSN 3 are to detect new GPRS mobile terminals in its serving area, handle the process of registering the new mobile terminals along with the GPRS registers, send/receive data packets to/from the concerned mobile terminal and keep a record of the location of the mobile terminals inside its service area. The subscription information is stored in a GPRS register where the mapping between a mobile's identity and the PSPDN (Packet Switched Public Data Network) address (e.g. IP network address) is stored. The GPRS register acts as a data base from which the SGSN 3 can derive whether a new mobile terminal in its area is allowed to join the GPRS core network.

In the idle state, the UE 1 does not have a logical GPRS context activated or any PSPDN addresses allocated. In this state, the UE 1 can only receive multicast messages which can be received by any GPRS mobile terminal. Since the GPRS network infrastructure does not know the location of the UE 1, it is not possible to send any messages to the UE 1 from the external IP network 6.

When the UE 1 is switched on, the first procedure performed between the UE 1 and the GPRS core network is radio synchronisation. When the UE 1 wants to start using the GPRS service of the UMTS network, it initiates a context activation procedure to establish a context of the logical link between the UE 1 and the SGSN 3 using a dedicated control channel as a carrier.

In case a call is to be transferred between the TE 5 of the IP network 6 and the UE 1, a capability information has to be exchanged between the UE 1 and the TE 5, so as to assure the capability requirements on the transmission path via the UMTS network and the IP network 6.

According to the initially mentioned prior art, the known system was arranged to use the RSVP between the UE 1 or the GGSN 4 and the external TE 5 to signal the capability requirements, e.g. QoS requirement (i.e. UE↔TE or GGSN↔TE).

According to the preferred embodiment of the present invention, an application protocol is set up between the UE 1 and TE 5 before the activation of the PDP (Packet Data Protocol) context and the actual call transfer. In this case, the capabilities can be agreed in advance based on the protocol messages of the application protocol.

An application protocol suitable for this purpose is e.g. the protocol according to the International Telecommunications Union (ITU) Recommendation H.323. This standard covers technical requirements for narrow band visual telephone (or audio graphics) services. H.323 covers the elements needed for a visual telephone call. Video codex and shared application standards are not required for audio telephone calls, but exist within the same standard framework. H.323 is an application protocol which specifies packet-based multimedia communication systems across networks which might not provide any QoS guarantees. The H.323 protocol is applicable to any IP based network, including the Internet and applies to audio-only terminals as well as those with video capabilities.

To establish a point-to-point call using H.323 two TCP connections are required. The first of these which must be set up is commonly known as the Q.931 channel. The calling endpoint initiates set up of this TCP connection to the called endpoint. Call setup messages are then exchanged as defined in H.225.0. If the called endpoint accepts the call, then the IP address and port for the additional H.245 channel that needs to be set up is conveyed to the calling endpoint using the Q.931 channel. The calling endpoint can then open a TCP connection to the indicated address and port to form the H.245 channel. Once, the H.245 channel has been set up, the Q.931 channel is no longer required in the case of a simple call and may be closed by either one of the endpoints.

In view of the fact that the Q.931 messages include a number of message-specific information elements comprising a capability information, the required transfer of the capability information between the TE 5 and the UE 1 can be achieved by performing a H.323 setup.

Alternatively, the Session Initiation Protocol (SIP) which is an IETF protocol for initiating calls in IP networks could be used for transferring the capability information. The SIP is an application level protocol developed by the IETF's Multiparty Multimedia Session Control Working Group and is described in RFC 2453. SIP can be used to establish multimedia sessions or call such as internet telephony, multimedia conferencing and distance learning. SIP handles the following cases of communication: User location, user capability, user availability, call setup and call handling.

The first step in the initiation of a call using SIP is to locate a SIP server for the called endpoint. This can be achieved by sending a client request to the SIP-server which may be either a default local proxy SIP server or the SIP server for the called party. The SIP server for the called party can be located based on the SIP address if it is a numeric IP address. Alternatively, the DNS (Domain Name Server) can be used to obtain a list of addresses that can be tried for SIP servers. Once a SIP server has been found, the calling endpoint can invite the called endpoint to join the communication session. The protocol message exchanges for the indication process vary depending on whether the contacted server acts as a proxy server or a redirect server for that particular invitation.

Thus, the above suggested H.323 and SIP protocols provide a possibility for exchanging the capability information (e.g. QoS-requirements) before actually performing call transfer. However, other suitable application protocols such as the H.248 terminal control protocol may be used for this purpose.

Figure 2:
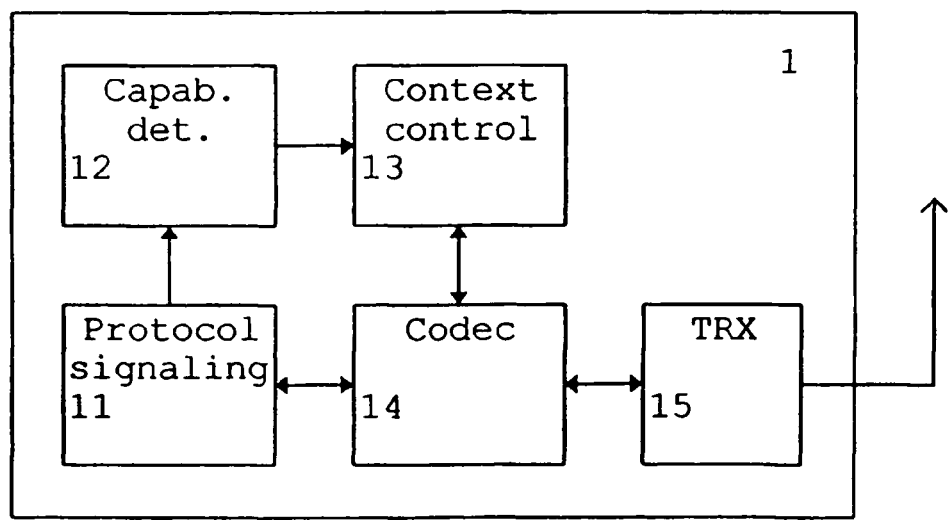
FIG. 2 shows a basic block diagram of a user equipment according to the preferred embodiment of the present invention.

FIG. 2 shows a basic block diagram of the UE 1 according to the preferred embodiment of the present invention. It is to be noted that only those parts essential for the present invention are shown in FIG. 2.

According to FIG. 2, the UE 1 comprises a transceiver (TRX) 15 arranged to transmit or receive signals via the wireless connection to/from the UTRAN 2. The TRX 15 is connected to a codec 14 arranged to perform a suitable coding or decoding of the signals transmitted to or received from the UMTS network.

Furthermore, a protocol signaling unit 11 is provided, which performs a setup signaling of an application protocol (e.g. H.323, H.248 or SIP), when a call is to be originated at the UE 1. Then, the exchange of the protocol messages between the UE 1 and the called TE 5 are supplied to a capability determination unit 12 arranged to determine an agreed capability based on the capability information received with the protocol message from the TE 5. The determined or agreed capability is then supplied to a context control unit 13 which maintains and generates the context information required for a context activation message transmitted to the SGSN 3 so as to establish the required capability in the GPRS core network of the UMTS network.

It is to be noted that the transfer of the initial setup messages of the application protocol is performed in the GPRS core network by using a signaling or default context. Furthermore, it should be noted that the functions of the blocks 11 to 13 shown in FIG. 2 may be achieved by corresponding control programs or routines used to control a processing means (e.g. CPU) arranged in the UE 1.

In the following, the context activation signaling is described for a mobile-originated call and a mobile-terminated call based on FIGS. 3 and 4, respectively.

Figure 3:
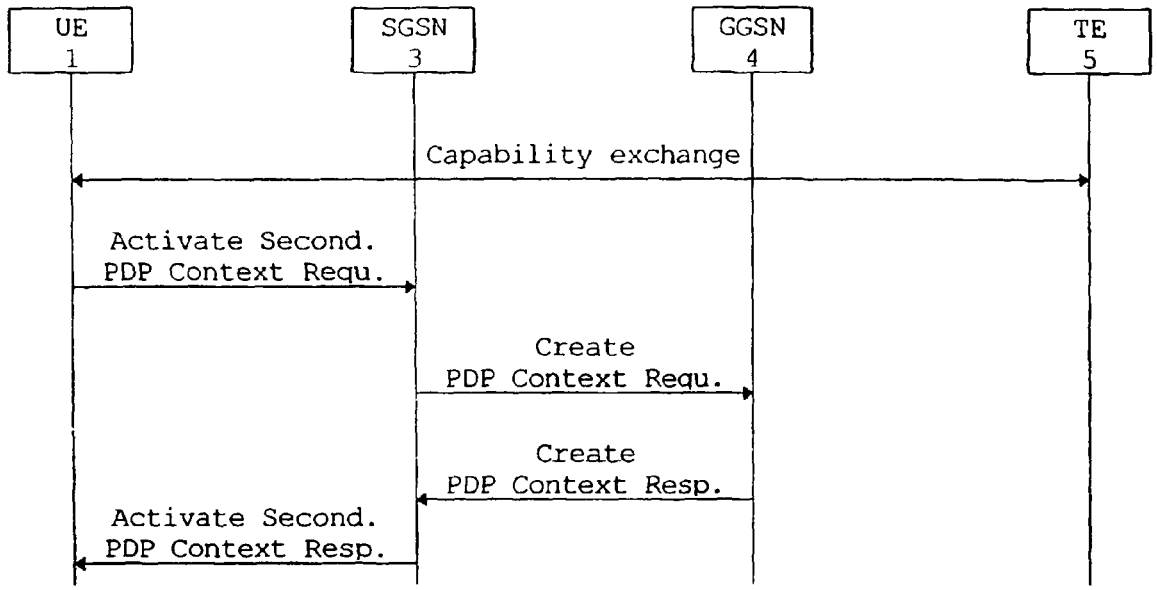
FIG. 3 shows a signaling diagram indicating a PDP activation signaling for a mobile-originated call according to the preferred embodiment of the present invention.

FIG. 3 shows a signaling diagram for the case of a mobile-originated call, i.e. the UE 1 is the calling endpoint. When the UE 1 wants to transfer a call to the external TE 5, it controls the protocol signaling unit 11 so as to initiate a setup signaling using an application protocol as the above mentioned H.323, H.248 or SIP protocols. The protocol messages exchanged during the setup procedure are transferred using the signaling or default PDP context within the UMTS network. Thus, the UE 1 is able to communicate with the called TE 5 on the required capabilities (e.g. kind of codecs etc.).

When the capability determination unit 12 has determined the agreed capability, this capability information is supplied to the context control unit 13 which is then controlled to initiate a secondary PDP context activation corresponding to the agreed capability. To achieve this, the context control unit 13 generates an Activate Secondary PDP Context Request message and performs control so as to transmit this message to the SGSN 3. Based on parameters (e.g. QoS requested, including QoS parameters like maximum bitrate, guaranteed bitrate, transfer delay etc.) included in this message, the agreed capability information, e.g. desired QoS profile, is determined by performing a mapping operation between the agreed capability information and the parameters. The SGSN 3 then validates the Activate Secondary PDP Context Request message and derives an address of the corresponding GGSN 4. Then, the SGSN 3 creates a Tunnel Identifier (TID) for the requested PDP context and transmits a Create PDP Context Request message to the GGSN 4. The GGSN 4 uses an Access Point Name included in the Create PDP Context Request Message to find the IP network 6 and creates a new entry in its PDP context table. The new entry allows the GGSN 4 to route corresponding data packets between the SGSN 3 and the external IP network 6. Furthermore, the GGSN 4 establishes the required capabilities (e.g. negotiated QoS) and returns a Create PDP Context Response message to the SGSN 3. In response thereto, the SGSN 3 returns an Activate PDP Context Response message to the UE 1 and is now able to route data packets between the GGSN 4 and the UE 1.

Thus, the capability requirements (e.g. QoS mechanisms) provided for the called party depend on the environment of the called party, e.g. the capabilities defined in the secondary PDP context activation. However, there is no longer need to use the RSVP between the UE 1 or the GGSN 4 and the TE 5 to signal the capability requirements (e.g. kind of codecs etc.) to the called party.

Figure 4:
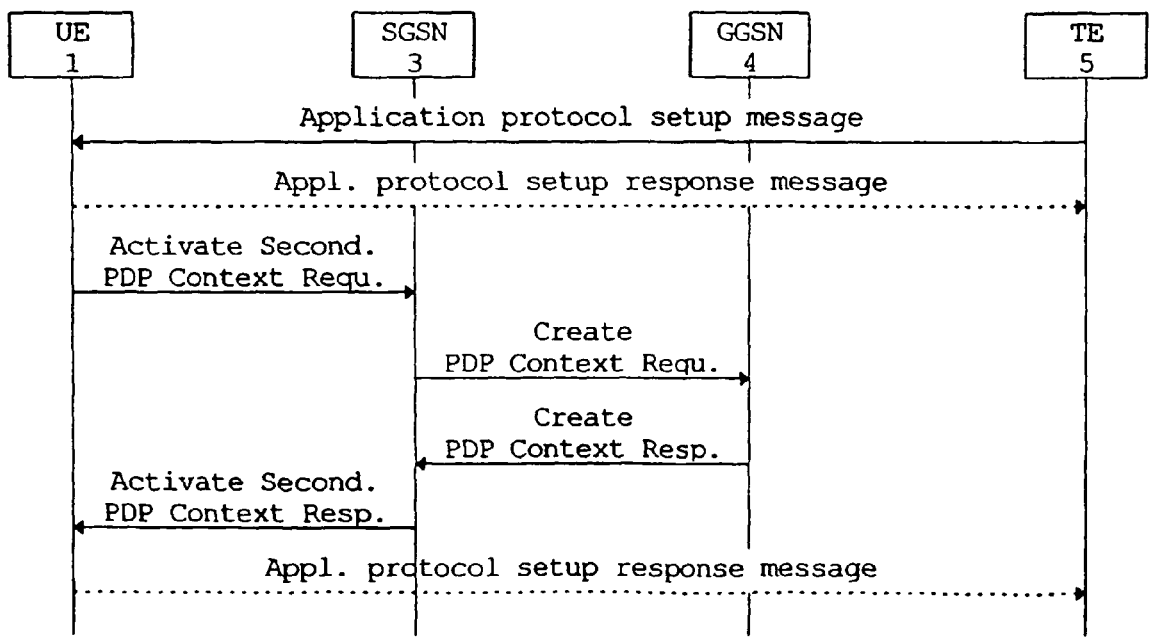
FIG. 4 shows, a signaling diagram indicating a PDP activation for a mobile-terminated call according to the preferred embodiment of the present invention.

FIG. 4 shows a signaling diagram for the case of a mobile-terminated call, i.e. the TE 5 transfers a call to the UE 1. In this case, the TE initially transmits a setup message of an application protocol such as the above mentioned H.323, H.248 or SIP to the UE 1, while the signaling or default context is used within the UMTS network to transparently transfer this message. The protocol setup message is then supplied to the protocol signaling unit 11 of the UE 1, which may directly generate a protocol setup response message so as to acknowledge the protocol setup. Based on the receipt protocol setup message, the capability determination unit 12 determines an agreed capability and supplies the determined capability to the context control unit 13. Then, the context control unit 13 performs control so as to transmit an Activate Secondary PDP Context Request message to the SGSN 3. Then, as described in connection with FIG. 3, the SGSN 3 issues a Create PDP Context Request message to the GGSN 4 based on the capability information included in the Activate Secondary PDP Context Request message received from the UE 1. Having received the Create PDP Context Response message from the GGSN 4, the SGSN 3 transmits the Activate Secondary PDP Context Response message to the UE 1, to thereby establish the connection within the UMTS network.

As an alternative, the above mentioned application protocol setup response message may be transmitted after the secondary PDP context activation, as indicated by the broken arrows shown in FIG. 4.

Thus, also in the mobile-terminated call, the UE 1 initiates the secondary PDP context activation. The UE 1 has received the capabilities of the calling TE 5 and knows its own capabilities, such that the capability determination unit 12 is able to set the minimum capability requirements (e.g. QoS requirements) for the PDP context according to the agreed capabilities. Moreover, also in this case, the RSVP between the UE 1 or the GGSN 4 and the TE 5 is not required to be used to signal the capability requirements to the TE 5.

In case other intermediate networks are arranged between the UMTS network and the IP network 6, the IETF Differentiated Services (Diffserv) mechanism can be used to provide the required capability, e.g. QoS profile. Diffserv defines a service where an octet in the packet header is used to mark packets with a codepoint value. The marked packets indicate a class of service to be established by network routers routing the packets to the destination.

However, any suitable mechanism may by used to provide the required capability in the intermediate networks.

In summary, a method and system is described for activating a context in a first network so as to transfer a call and/or a transaction via said first network and a second network. Initially, an application protocol such as H.323, H.248 or SIP is set up using a signaling or default context within the first network. Based on a message of the application protocol transmitted from the second network, a capability information is determined and used to activate the context. Thereby, the capabilities can be agreed in advance and the context can be activated e.g. as a secondary context for both mobile-originated and mobile-terminated calls and/or transactions. Accordingly, a reservation protocol is no longer required to signal the capability requirements to the second network, and signaling load can be decreased.

It is pointed out that the context activation method and system described in the preferred embodiment can be applied to any network in which a context can be activated to establish a required capability. Moreover, any application protocol by means of which a capability exchange can be performed using protocol messages can be applied so as to agree the required capability before actually activating the context. The capability is not restricted to the QoS requirements, but any capability requirement which can be exchanged via protocol messages and which is required in the context activation can be agreed by the proposed solution. The above description of the preferred embodiment and the accompanying drawings are only intended to illustrate the present invention. The preferred embodiment of the invention may thus vary within the scope of the attached claims.

We claim:

1. An apparatus, comprising:
   a receiver configured to receive a setup message according to an application protocol using at least one of a signaling and a default context within a network; and
   a processor configured to
      determine capability information based on the setup message according to the application protocol, without using a resource reservation protocol to reserve resources through a routing path; and
      activate a context using the determined capability information,
   wherein
      the processor is configured to set up the application protocol before activating the context.

2. The apparatus of claim 1, wherein the processor is further configured to determine the capability information, without using the resource reservation protocol to reserve resources through the routing path from a first terminal equipment to a second terminal equipment.

3. The apparatus of claim 1, wherein the application protocol is set up between a calling equipment and a called equipment before activating the context.

4. The apparatus of claim 1, wherein the processor is further configured to determine the capability information based on a capability agreed upon in a negotiation with a called endpoint connected to another network, wherein the processor is configured to initialize the negotiation.

5. The apparatus of claim 1, wherein the processor is further configured to determine the capability information based on a protocol message received from a call origination endpoint.

6. The apparatus of claim 1, wherein the apparatus comprises a mobile terminal.

7. The apparatus of claim 1, wherein the application protocol comprises at least one of a H.323 protocol, a H.248 protocol, and a session initiation protocol.

8. The apparatus of claim 1, wherein the capability information is a quality of service requirement.

9. The apparatus of claim 8, wherein the quality of service requirement comprises one or more of a kind of codec, a maximum bitrate, a guaranteed bitrate, and a transfer delay.

10. A method, comprising:
    receiving a setup message according to an application protocol using at least one of a signaling and a default context within a network;
    determining capability information based on the setup message according to the application protocol, without using a resource reservation protocol to reserve resources through a routing path; and
    activating a context using the determined capability information, wherein
    the application protocol is set up before activating the context.

11. The method of claim 10, wherein the capability information is determined without using the resource reservation protocol to reserve resources through the routing path from a first terminal equipment to a second terminal equipment.

12. The method of claim 10, wherein the set up is performed at a call origination endpoint.

13. The method of claim 10, wherein the call is a voice call.

14. The method of claim 10, wherein the network is a mobile network, and the context is a secondary packet data protocol context.

15. The method of claim 14, wherein the mobile network is a universal mobile telecommunications system network.

16. The method of claim 10, wherein the application protocol comprises at least one of a H.323 protocol, a H.248 protocol, and a session initiation protocol.

17. The method of claim 10, wherein the capability information is a quality of service requirement.

18. The method of claim 17, wherein the quality of service requirement comprises one or more of a kind of codec, a maximum bitrate, a guaranteed bitrate, and a transfer delay.

19. An apparatus, comprising:
    receiving means for receiving a setup message according to an application protocol using at least one of a signaling and a default context within a network;
    determining means for determining capability information based on said setup message according to the application protocol, without using a resource reservation protocol to reserve resources through a routing path; and
    activating means for activating a context using said determined capability information, wherein
    the apparatus is configured to set up the application protocol before activating said context.

20. The apparatus of claim 19, wherein the activating means is configured to transmit a context activation request message comprising the determined capability information to the network.

21. The apparatus of claim 19, wherein the set up is located at a call origination end-point of at least one of the call and a transaction.

22. The apparatus of claim 19, wherein the determining means is configured to determine the capability information based on a capability agreed in a setup negotiation with a called endpoint, wherein the setup negotiation is initialized by the apparatus.

23. The apparatus of claim 19, wherein the determining means is configured to determine the capability information based on a protocol message received from a call origination endpoint.

24. The apparatus of claim 19, wherein the capability information is determined without using the resource reservation protocol to reserve resources through the routing path from a first terminal equipment to a second terminal equipment.

25. The apparatus of claim 19, wherein the application protocol is set up between a calling equipment and a called equipment before activating the context.

26. A computer program embodied on a non-transitory computer-readable medium, the computer program controlling a processor to perform a process, the process comprising:
    receiving a setup message according to an application protocol using at least one of a signaling and a default context within a network;
    determining capability information based on the setup message according to the application protocol, without using a resource reservation protocol to reserve resources through a routing path; and
    activating a context using the determined capability information, wherein the application protocol is setup before activating the context.

27. The computer program of claim 26, wherein the activation is performed by transmitting a context activation request message comprising required information to the network, wherein the capability information is mapped to the required information.

28. The computer program of claim 26, wherein the set up is performed at a call origination endpoint.

29. The computer program of claim 26, wherein the call is a voice.

30. The computer program of claim 26, wherein the network is a mobile network, and the context is a secondary packet data protocol context.

31. The computer program of claim 30, wherein the mobile network is a universal mobile telecommunications system network.

32. The computer program of claim 26, wherein the application protocol comprises at least one of a H.323 protocol, a H.248 protocol, and a session initiation protocol.

33. The computer program of claim 26, wherein the capability information is a quality of service requirement.

34. The computer program of claim 33, wherein the quality of service requirement comprises one or more of a kind of codec, a maximum bitrate, a guaranteed bitrate, and a transfer delay.

* * * * *